April 7, 1942. J. R. HENDERSON 2,278,992
POWER PLANT
Filed Sept. 13, 1939
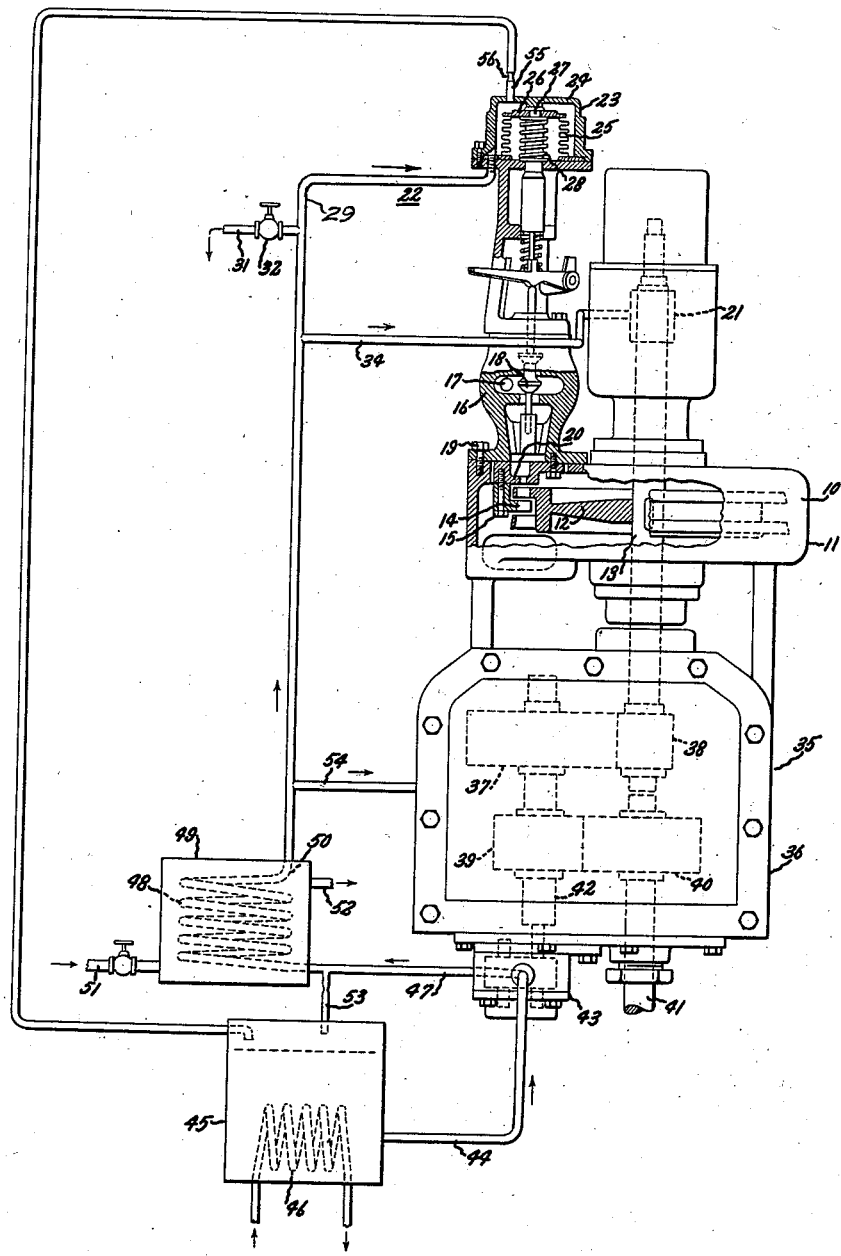
Inventor:
John R. Henderson,
by Harry E. Dunham
His Attorney.

Patented Apr. 7, 1942

2,278,992

UNITED STATES PATENT OFFICE 2,278,992

POWER PLANT

John R. Henderson, Swampscott, Mass., assignor to General Electric Company, a corporation of New York Application September 13, 1939, Serial No. 294,640

2 Claims. (Cl. 253—39)

The present invention relates to power plants such as elastic fluid turbine arrangements subject to considerable atmospheric temperature changes as take place when such plants are located outdoors. More specifically the invention relates to arrangements for supplying oil to bearings, hydraulic governing mechanisms and other apparatus forming parts of outdoor elastic fluid turbine plants. It has been found that extreme cold weather may cause freezing of the oil or like liquid in the piping after shut-down of the plant. Frozen oil pipes may render the governing mechanism of such plants inoperative and may endanger the operation of the plant due to lack of lubrication of the bearing.

The object of my invention is to provide an improved arrangement of power plants whereby the aforementioned drawbacks are substantially overcome.

For a consideration of what I believe to be novel and my invention, attention is directed to the following description and the claims appended thereto in connection with the accompanying drawing.

The single figure of the drawing illustrates somewhat diagrammatically an elastic fluid turbine plant in accordance with my invention.

The arrangement comprises an elastic fluid turbine 10 having a casing 11 and a rotor in the form of a wheel 12 secured to a vertical drive shaft 13 and provided with two rows of buckets or blades. A nozzle ring or diaphragm 14 is interposed between the two rows of buckets of the wheel 12 and supported on the casing 11 by bolt means 15. Elastic fluid is supplied to the turbine by means including a valve chest 16 having an inlet 17 and a valve 18. The chest is secured to the casing 11 by bolts 19 and the elastic fluid is directed to the first row of buckets on wheel 12 by nozzles formed in a nozzle plate 20. The turbine shaft 13 has an upper end supported on and guided by bearing means 21. The turbine inlet valve 18 is controlled by a hydraulic governing mechanism 22 which includes a hydraulic motor 23, in the present instance in the form of a pressure-responsive device having a casing 24 enclosing a bellows 25 which has a lower end rigidly supported and an upper movable plate 26 connected to a stem 27 and biased upward by a compression spring 28. The stem 27 is connected in conventional manner to the valve 18. The space between the casing 24 and the bellows 25 is subject to oil pressure through a pipe 29. The oil pressure required in the bellows 25 for holding the valve 18 in any given position is substantially constant except for the change due to the spring action of the bellows 25 and the gradient of the spring 28. This change is relatively small. The turbine speed then is determined by the position of the valve 32. The opening of the valve 32 reduces the pressure in the hydraulic motor 23 and thereby causes expansion of the bellows 25 which permits opening of the turbine inlet valve 18 and causes increase of the turbine speed. Similarly, closing of the valve 32 causes increase in pressure of the oil in the motor 23, resulting in closing of the inlet valve 18 and decrease of the turbine speed.

The bearing means 21 in the present instance includes a sleeve bearing to which lubricant is supplied by a pipe 34 connected to the aforementioned pipe 29.

The vertical shaft 13 of the turbine which constitutes a drive or input shaft has a lower end connected to a gearing 35. This gearing includes a casing 36 and two pairs of gears 37, 38 and 39, 40 enclosed in the casing 36, the gear 38 being secured to the shaft 13 and the gear 40 being secured to a drive or output shaft 41. This output shaft 41 is in alinement with the turbine shaft 13 and has a portion projecting through an opening in the casing 36 for driving a pump or other apparatus, not shown. The gears 37 and 39 are secured to a common shaft 42 which has a lower reduced portion projecting through the casing 36 and arranged to drive a gear pump 43 for forcing oil to the aforementioned governing mechanism and bearing of the turbine. To this end the pump 43 has an inlet connected by a pipe 44 to an oil tank 45 which includes a heating coil 46. The discharge end of the pump 43 is connected by a pipe 47 to a coil 48 forming part of an oil temperature conditioning tank 49 and having a discharge end 50 connected to the inlet of the aforementioned conduit 29. Water or like medium is circulated through the tank 49 which for this purpose is provided with an inlet conduit 51 and a discharge conduit 52. Both the heating coil 46 in the tank 45 and the tank 49 serve for conditioning the temperature of the oil or like fluid before it is discharged into the conduit 29. The discharge pipe 47 of the pump has a branch with an orifice 53 through which oil is continuously discharged into the reservoir 45. The purpose of the orifice 53 is to permit oil discharge and venting under shut-down condition.

The oil supply system also serves for conducting lubricant to the speed-reducing gearing 35 by means including a pipe 54 connected to the conduit 29.

The casing 36 of the gearing 35 also forms a support for the turbine casing 10 and other elements supported on the latter. During operation, oil under pressure is supplied through the conduit 29 to the gearing 35, the bearing means 21 and the hydraulic governing mechanism 23, 31, 32. Oil is normally continuously circulated through these devices, in particular the hydraulic motor 23, thus preventing freezing of the oil therein during cold weather conditions.

The oil supply system is such that upon shut-down the oil is drained through the pipes 34, 29 and returned to the tank 45 to avoid freezing of oil in the pipes during cold weather. In order to permit draining, means are provided to admit air from the atmosphere to the various devices requiring oil during operation, preferably to a point near the upper level of the system, that is, in such a manner that no oil will be trapped anywhere in the lubricating and governing system. In the present example the hydraulic motor 23 has an upper end connected to a pipe 55 with an orifice or restricted portion 56. During normal operation of the plant, oil under pressure supplied through the conduit 29 to the cylinder 24 is continuously drained through the pipe 55 and discharged to the tank 45 above the oil level therein. Upon shut-down the pipe 55 which in substance constitutes a vent admits atmospheric air to the upper portion of the motor 23 and thereby permits draining of oil contained therein through the pipe 29 and emptying of the latter.

After shut-down the pipe 34 also empties through the pipe 29 into the tank 45. Special means for admitting air to the pipe 34 are not needed because the bearing 21 is not air-tight and upon shut-down admits sufficient air to facilitate emptying of the pipe 34. This also applies with regard to the pipe 54 for normally conducting lubricant to the gearing 35.

What I claim as new and desire to secure by Letters Patent of the United States is:

1. Elastic fluid turbine power plant including a turbine, a hydraulic governing mechanism having a bellows type motor for controlling the turbine and an oil supply system connected to the motor, and comprising a supply pipe and a drain pipe with a restricted portion for normally continuously circulating oil under pressure through the motor and means effecting substantially complete draining of oil from the system upon shut-down of the turbine comprising said drain pipe through which normally oil is continuously discharged from the motor and through which upon shut-down air is admitted to the motor.

2. Power plant for operation at temperatures below the freezing point of water including a turbine having a shaft, bearings supporting the shaft and a control valve, a hydraulic motor for moving the valve, a system for supplying oil to the bearing and to the motor, said system comprising an oil tank, a temperature conditioning device, means including conduits and a pump driven from the turbine for forcing oil from the tank through the device to the bearings and the hydraulic motor, said conduits being arranged to effect complete draining of the system upon shutdown, a conduit having a restricted portion therein, said last conduit being connected to permit a continuous circulation of oil through the motor during normal operation and serving to admit air to the upper level of the system to facilitate draining of the system upon shutdown.

JOHN R. HENDERSON.